United States Patent Office 2,878,156
Patented Mar. 17, 1959

2,878,156

1,1,2-TRIFLUOROETHYLFLUOROSULFONATE AND FUMIGATION PROCESS

Ralph A. Davis, Midland, Mich., assignor to The Dow Chemical Company, Midland, Mich., a corporation of Delaware No Drawing. Application December 31, 1956
Serial No. 631,438

3 Claims. (Cl. 167—39)

This invention relates to an organic chemical compound and is more particularly concerned with 1,1,2-trifluoroethylfluorosulfonate, a method for its preparation, and a method of using it in fumigation.

Patent 2,570,917 describes the use of 2-chloro-1,1-difluoroethylfluorosulfonate, and 1,1-difluoroethylfluorosulfonate as fumigants. In the actual testing of these compositions, they were successful in killing various insects in different stages of development, but the inherent instability of the compounds and the fact that they have poor penetrating qualities, in spite of their relatively low boiling points, precluded their wide-spread use as satisfactory fumigants.

It is, therefore, a principal object of the present invention to provide a chemical compound having a high degree of stability. Still another object of the present invention is to provide a novel organic fluorine-containing compound for use as a fumigant which has a high degree of penetrating power. Another object of the present invention is to provide a novel organic sulfur-containing compound which is a stable fumigant and which can be readily prepared by reacting trifluoroethylene with a fluorosulfonic acid. Still another object of the present invention is to provide a fumigation process which has a high degree of penetration. Other objects will become apparent hereinafter.

The foregoing and additional objects have been accomplished by a provision of a novel organic chemical compound, 1,1,2-trifluoroethylfluorosulfonate and a method whereby it can be prepared. This compound is relatively stable and has excellent fumigation penetrating powers when tested in flour.

Preparation of the fluorosulfonate of the present invention is readily accomplished by contacting trifluoroethylene with fluorosulfonic acid. The reaction is normally conducted at about room temperature, but temperatures as low as 0 degrees centigrade and as high as 100 degrees centigrade are satisfactory. Any proportion of the ingredients may be used; however, a 1:1 mole ratio is desired and, under certain circumstances, a slight excess of trifluoroethylene might be used. Separation of the trifluoroethylfluorosulfonate is readily accomplished by fractional distillation, the desired sulfonate boiling from 80.5 to 81 degrees centigrade at 747 millimeters of mercury absolute.

In direct contrast to the difluoroethylfluorosulfonates, known to the prior art, the compound of the present invention is relatively stable, not decomposing to a substantial extent upon mere standing.

The following example is given to illustrate the process of the present invention but is not to be construed as limiting.

*Example*

Trifluoroethylene (68 grams, 0.83 mole) was bubbled through 70 grams (0.7 mole) of fluorosulfonic acid and the unreacted gases recycled until reaction ceased. During the reaction, the temperature of the reaction mass was held between 20 and 30 degrees centigrade by cooling and regulating the rate of introduction of the trifluoroethylene. When reaction had been completed, the reaction mass was distilled to yield 5 grams of a headcut boiling at 50 to 80 degrees centigrade, 85 grams of 1,1,2-trifluoroethylfluorosulfonate, boiling at 80.5 to 81 degrees centigrade at 747 millimeters of mercury absolute (65.7 percent of the theoretical yield), and a residue of 28 grams. The structure of 1,1,2-trifluoroethylfluorosulfonate was confirmed by mass spectroscopy.

Comparative fumigation testing between the compound of the present invention and 2-chloro-1,1-difluoroethylfluorosulfonate and 1,1 - difluoroethylfluorosulfonate yielded the following results in a comparative testing technique to determine their penetrating power. The test consisted of providing 0.25 pound of fumigant per 1000 cubic feet of air space, placing in this air space an upright tube closed at one end and filled with flour. Black carpet beetles and confused flour beetles were buried at varying depths in the flour. The chart records these results:

| Inches Buried in Flour | $R-CH_2-CF_2-SO_3F$ | | | | | |
|---|---|---|---|---|---|---|
| | R=Cl | | R=F | | R=H | |
| | Percent Kill | | | | | |
| | BCB | CFB | BCB | CFB | BCB | CFB |
| 1 | 100 | 100 | 100 | 100 | 0 | 0 |
| 5 | 0 | 0 | 100 | 100 | 0 | 0 |
| 9 | 0 | 0 | 100 | 100 | 0 | 0 |

The above chart shows that the compound of the present invention has outstanding utility because of its excellent penetration properties. It penetrates at least 9 times that of the comparison materials. It was totally unexpected that such a penetration effect could be achieved because the boiling point of the claimed material is greater than the boiling point of the 1,1-difluoroethylfluorosulfonate of the prior art.

Various modifications may be made in the present invention without departing from the spirit and scope thereof and it is to be understood that I limit myself only as defined by the appended claims.

I claim:
1. 1,1,2-trifluoroethylfluorosulfonate.
2. A process for preparing 1,1,2-trifluoroethylfluorosulfonate which comprises: contacting trifluoroethylene with fluorosulfonic acid and separating 1,1,2-trifluoroethylfluorosulfonate from the reaction mixture.
3. In a process for combating pest organisms by fumigation, the step which comprises: contacting such organisms with vapors of 1,1,2-trifluoroethylfluorosulfonate.

References Cited in the file of this patent

UNITED STATES PATENTS

| 2,570,917 | Calfee | Oct. 9, 1951 |
| 2,732,398 | Brice et al. | Jan. 24, 1956 |

FOREIGN PATENTS

| 579,897 | Great Britain | Aug. 20, 1946 |